(12) United States Patent
Katsuda et al.

(10) Patent No.: US 12,398,002 B1
(45) Date of Patent: Aug. 26, 2025

(54) LINEAR TRANSPORTER AND METHOD FOR MANUFACTURING LINEAR TRANSPORTER

(71) Applicant: Mitsubishi Electric Corporation, Tokyo (JP)

(72) Inventors: Yusuke Katsuda, Tokyo (JP); Yoshinao Tatei, Tokyo (JP); Toshio Mekata, Tokyo (JP); Takeshi Musha, Tokyo (JP); Akira Hotta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/117,988

(22) PCT Filed: Apr. 17, 2023

(86) PCT No.: PCT/JP2023/015306
§ 371 (c)(1),
(2) Date: Apr. 3, 2025

(87) PCT Pub. No.: WO2024/218820
PCT Pub. Date: Oct. 24, 2024

(51) Int. Cl.
*B65G 54/02* (2006.01)
*G01D 5/14* (2006.01)
*H02K 41/03* (2006.01)

(52) U.S. Cl.
CPC ............ *B65G 54/02* (2013.01); *H02K 41/031* (2013.01); *B65G 2203/0233* (2013.01); *B65G 2203/043* (2013.01); *G01D 5/145* (2013.01)

(58) Field of Classification Search
CPC ...... B65G 54/02; H02K 41/02; H02K 41/031; G01D 5/145; G01D 5/2205; G01D 5/18; G01D 2205/40

(Continued)

(56) References Cited

U.S. PATENT DOCUMENTS 8,547,083 B2 10/2013 Ausderau
9,621,097 B2 4/2017 Takagi
(Continued)

FOREIGN PATENT DOCUMENTS

CN 109690605 A * 4/2019 ............... B65B 3/04
JP 2001-245386 A 9/2001
(Continued)

OTHER PUBLICATIONS

International Search Report and Written Opinion mailed on Jul. 4, 2023, received for PCT Application PCT/JP2023/015306, filed on Apr. 17, 2023, 9 pages including English Translation.

(Continued)

*Primary Examiner* — James R Bidwell
(74) *Attorney, Agent, or Firm* — XSENSUS LLP (57) ABSTRACT

A linear transporter includes: a transport path including a stator; multiple transport bodies that move along the transport path; a magnetizer that is installed on each of the transport bodies and generates a magnetic field for use in position detection; a magnetic detection element that is installed on the transport path and detects the magnetic field; a calculator that calculates the position of each of the transport bodies on the basis of the magnetic field detected by the magnetic detection element; and a correction value storage that stores a correction value set, which is a combination of correction values for correcting the position of each of the transport bodies. The magnetizer includes a magnet in which magnetic poles of different polarities are arranged alternately along a moving direction of the transport bodies.

12 Claims, 3 Drawing Sheets

(58) Field of Classification Search
USPC .......................................................... 198/805
See application file for complete search history.

(56) References Cited

U.S. PATENT DOCUMENTS

| | | | | |
|---|---|---|---|---|
| 2010/0072830 | A1* | 3/2010 | Ausderau | ............... G01D 5/145 |
| | | | | 310/12.19 |
| 2019/0214930 | A1* | 7/2019 | Mukai | ..................... H02P 6/006 |
| 2022/0223447 | A1* | 7/2022 | Hatano | ............... H01L 21/6838 |
| 2024/0240969 | A1 | 7/2024 | Tatei et al. | |

FOREIGN PATENT DOCUMENTS

| | | | |
|---|---|---|---|
| JP | 2013-102570 | A | 5/2013 |
| JP | 2018-072086 | A | 5/2018 |
| JP | 2018-133954 | A | 8/2018 |
| JP | 2022-030250 | A | 2/2022 |
| JP | 7046290 | B1 | 4/2022 |

OTHER PUBLICATIONS

Notification of Reason for Refusal mailed on Dec. 5, 2023, received for JP Application 2023-565611, 10 pages including English Translation.

Decision to Grant a Patent mailed on Feb. 20, 2024, received for JP Application 2023-565611, 5 pages including English Translation.

* cited by examiner

LINEAR TRANSPORTER AND METHOD FOR MANUFACTURING LINEAR TRANSPORTER

CROSS-REFERENCE TO RELATED APPLICATION

This application is a national stage application, pursuant to 35 U.S.C. § 371, of International Patent Application No. PCT/JP2023/015306, filed Apr. 17, 2023, the entire contents of which are incorporated herein by reference.

FIELD

The present disclosure relates to a linear transporter that detects the positions of movers and to a method for manufacturing the linear transporter.

BACKGROUND

To accurately control the position of a mover, a linear transporter includes position detectors to detect the position of a mover on the basis of magnetic energy of a magnet disposed on the mover. In such linear transporter, presence of movers that approach each other causes magnetic interference between magnets, thereby resulting in a decrease in accuracy in position detection performed by the position detectors. In addition to this, a linear transporter is subjected to a variation in position detection value among the position detectors due to factors such as a dimensional tolerance in manufacturing process of the movers, thereby also resulting in a decrease in accuracy in position detection.

The position detector described in Patent Literature 1 includes a magnetic shield for suppressing magnetic interference between magnets of movers that approach each other, where the magnetic shield is provided on end portions in the moving direction and on a rear surface, of the position detection magnet included in each of the movers.

CITATION LIST

Patent Literature

Patent Literature 1: Japanese Patent No. 7046290

SUMMARY OF INVENTION

Problem to be Solved by the Invention

However, the technology of Patent Literature 1 described above has difficulty in accurately forming, into a desired shape, a corner portion on an inside surface of the magnetic shield at which, in the magnetic shield, an inside surface facing the position detection magnet, of a rear-side magnetic shielding portion provided on the rear surface, meets an inside surface facing the position detection magnet, of a lateral magnetic shielding portion provided on a lateral surface. That is, formation of the corner portion into the shape of the magnet with high accuracy is difficult in both cases: where the magnetic shield is formed by bending a plate-shaped magnetic body into a shape covering the rear surface and two lateral surfaces of the magnet; and where the magnetic shield is formed by cutting a block of magnetic material into a shape covering the rear surface and the two lateral surfaces of the magnet. This may create a space between the magnet and the magnetic shield due to a dimensional tolerance, thereby causing an irregularity in the magnetic flux or in the magnetic lines of force. This presents a problem in a decrease in accuracy in position detection.

The present disclosure has been made in view of the foregoing, and it is an object of the present disclosure to provide a linear transporter capable of suppressing a decrease in accuracy in position detection.

Means to Solve the Problem

To solve the problem and achieve the object described above, a linear transporter of the present disclosure includes: a transport path including a stator; a plurality of transport bodies that move along the transport path; a magnetizer installed on each of the transport bodies configured to generate a magnetic field for use in position detection; and a magnetic detection element installed on the transport path to detect the magnetic field. The linear transporter of the present disclosure further includes: a calculator configured to calculate a position of each of the transport bodies on the basis of the magnetic field detected by the magnetic detection element; and a correction value storage configured to store a correction value set, which is a combination of correction values for correcting the position of each of the transport bodies. The magnetizer includes: a magnet in which magnetic poles of different polarities are arranged alternately along a moving direction of the transport bodies; and a magnetic shield that is a magnetic body and is formed of a resin containing a magnetic material powder, where the magnetic shield blocks magnetic lines of force originating from the magnet by being provided on two end surfaces of the magnet in the moving direction and on a top surface of the magnet, where the top surface is a surface opposite a counter surface that faces the transport path. The number of the correction value set is less than the number of the transport bodies. The calculator corrects the position of one of the transport bodies using one of the correction value set that is commonly applicable to another one of the transport bodies.

Effects of the Invention

A linear transporter according to the present disclosure provides an advantage of suppressing a decrease in accuracy in position detection.

DESCRIPTION OF EMBODIMENTS

A linear transporter and a method for manufacturing the linear transporter according to embodiments of the present disclosure will be described in detail below with reference to the drawings.

First Embodiment

Figure 1:
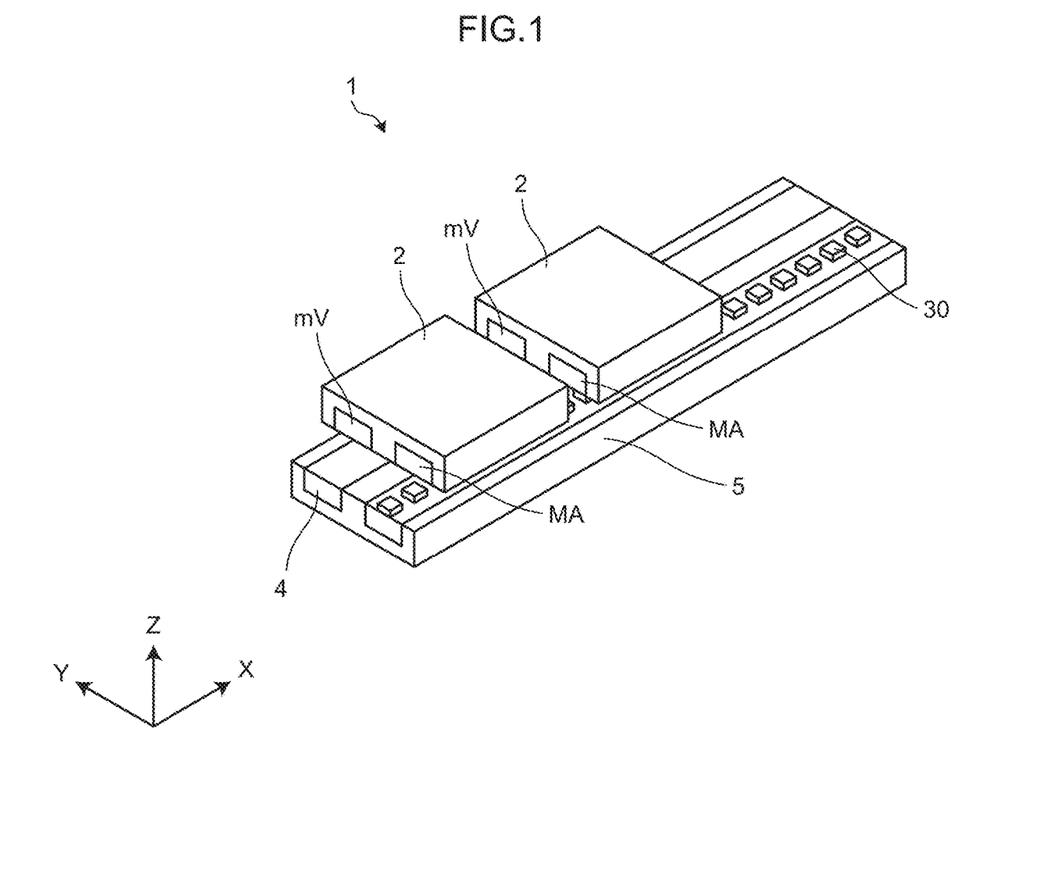
FIG. 1 is a perspective view illustrating a configuration of a linear transporter according to a first embodiment.
Figure 2:
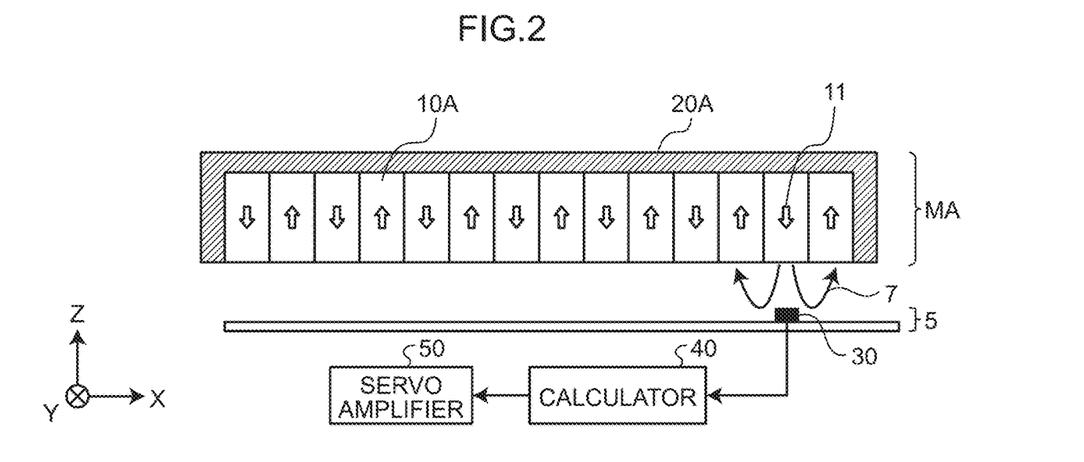
FIG. 2 is a side view illustrating a configuration of a magnetizer included in the linear transporter according to the first embodiment.

FIG. 1 is a perspective view illustrating a configuration of a linear transporter according to a first embodiment. FIG. 2 is a side view illustrating a configuration of a magnetizer included in the linear transporter according to the first embodiment. In FIGS. 1 and 2, two axes in a plane parallel to the top surface of a magnet 10A and perpendicular to each other are illustrated as X-axis and Y-axis, and the axis perpendicular to both the X-axis and the Y-axis is illustrated as Z-axis. For example, the plane parallel to the top surface of the magnet 10A (i.e., XY plane) is a horizontal plane, and the Z-axis direction is a vertical direction.

The linear transporter 1 includes: multiple carriers 2 for conveying articles; a stator 4; magnetic detection elements 30; a calculator 40; and a servo amplifier 50.

Each carrier 2 includes: a mover mV that generates a magnetic field for driving; and a magnetizer MA that generates a magnetic field for use in position detection. The mover mV and the magnetizer MA are disposed in a lower portion of each of the carriers 2. Note that the carriers 2 are an example of transport bodies. The transport bodies may each further include another component in addition to the mover mV and the magnetizer MA included in each of the carriers 2.

The linear transporter 1 further includes a transport rail 5, in which the stator 4 is installed. In the linear transporter 1, the carriers 2 are positioned to face the transport rail 5. That is, in the linear transporter 1, the mover mV is positioned to face the stator 4. In the linear transporter 1, movement of the mover mV above the stator 4 causes the corresponding one of the carriers 2 to move in the transport direction above the transport rail 5.

The stator 4 that generates a magnetic field for driving and the magnetic detection elements 30 that detect the positions of the carriers 2 are disposed on the transport rail 5. In the linear transporter 1, the mover mV and the stator 4 form a linear motor. One of the mover mV and the stator 4 can be formed using an electromagnet, and the other thereof can be formed using an electromagnet or a permanent magnet. Note that the transport rail 5 is an example of transport path. The transport path may further include other components as far as it includes the stator 4 and the magnetic detection elements 30 as the transport rail 5.

The magnetic detection elements 30 detect the magnetic field (i.e., magnetic flux density) generated by the magnetizer MA. In the linear transporter 1, a set of the magnetizer MA and the magnetic detection elements 30 is a position detector for the linear transporter. In the linear transporter 1, the mover mV and the stator 4 generate a magnetic field for driving, while the magnetizer MA generates a magnetic field for use in position detection. In the linear transporter 1, movement of the mover mV above the stator 4 causes the magnetizer MA to move above the magnetic detection elements 30 when the carrier 2 moves along the transport rail 5.

The magnetizer MA includes: a magnet (permanent magnet) 10A, in which magnetic poles of different polarities are arranged alternately; and a magnetic shield 20A, which blocks magnetic lines of force originating from the magnet 10A. The magnet 10A is disposed along the moving direction of the mover mV (i.e., the transport direction of the carrier 2).

The magnetic field of the magnet 10A is directed alternately in different directions along the moving direction of the carrier 2. That is, the magnet 10A includes multiple magnetic poles formed in a single magnetic body, arranged along the moving direction of the carrier 2. Note that the magnet 10A may be formed of a plurality of magnets arranged along the moving direction. The magnet 10A has a rectangular parallelepiped shape. FIG. 2 illustrates one lateral surface of the lateral surfaces of the magnet 10A having a rectangular parallelepiped shape. The magnet 10A is disposed in the carrier 2 to include the multiple magnetic poles arranged along a direction the same as the moving direction of the carriers 2.

In FIG. 2, the solid arrows 7 indicate the magnetic field generated by the magnet 10A. In addition, the open arrows 11 in the magnet 10A in FIG. 2 each indicates the direction of the magnetic field in the magnet 10A.

The magnetic shield 20A includes: lateral magnetic shielding portions provided on two end surfaces of the magnet 10A in the moving direction thereof (i.e., the front surface and the rear surface in the travel direction); and a top-surface magnetic shielding portion provided on a top surface of the magnet 10A, of which surface is a surface opposite a counter surface that faces the transport rail 5. Perpendicular lines from the front surface and from the rear surface of the magnetizer MA in the moving direction are parallel to the moving direction.

The end surfaces of the magnet 10A on which the lateral magnetic shielding portions are provided are the front surface and the rear surface of the magnet 10A. The surface of the magnet 10A on which the top-surface magnetic shielding portion is provided is the top surface opposite the counter surface that faces the transport rail 5. This configuration allows the magnetic shield 20A to be formed such that the lateral magnetic shielding portions and the top-surface magnetic shielding portion are joined to each other as viewed in the Y-axis direction, thereby forming a shape to cover the two end surfaces and the top surface of the magnet 10A.

Note that the top surface of the magnet 10A in tight contact with the top-surface magnetic shielding portion can also be regarded as the rear surface (back surface portion) of the magnet 10A when viewed from the transport rail 5. In addition, the inner wall surface of the top-surface magnetic shielding portion, in tight contact with the magnet 10A, can also be regarded as the bottom surface of the magnetic shield 20A when viewed from the transport rail 5.

Of the outer wall surface of the magnet 10A having a rectangular parallelepiped shape, the surfaces parallel to the YZ plane are two lateral surfaces, in other words, the front surface and the rear surface in the moving direction, of the magnet 10A. Of the outer wall surface of the magnet 10A having a rectangular parallelepiped shape, the surfaces parallel to the XY plane are the top surface and the bottom surface of the magnet 10A. In addition, of the outer wall surface of the magnet 10A having a rectangular parallelepiped shape, the surfaces parallel to the XZ plane are other two lateral surfaces of the magnet 10A.

In FIG. 1, the lateral magnetic shielding portions are in tight contact with the magnet 10A on the end surfaces thereof parallel to the YZ plane, and the top-surface magnetic shielding portion is in tight contact with the magnet 10A on the top surface thereof parallel to the XY plane. The lateral magnetic shielding portions cover the two end surfaces parallel to the YZ plane (i.e., the front surface and the rear surface) of the magnet 10A, and the top-surface magnetic shielding portion covers one of the surfaces parallel to the XY plane (i.e., the top surface) of the magnet 10A.

Of the outer wall surface of the magnet 10A having a rectangular parallelepiped shape, the front surface, the rear surface, and the top surface are in tight contact with the inner wall surface of the magnetic shield 20A. That is, the angled portion formed by the top surface and the front surface of the magnet 10A, and the angled portion formed by the top surface and the rear surface of the magnet 10A are covered by the inner wall surface of the magnetic shield 20A. Note that the angled portion formed by the top surface and the front surface of the magnet 10A and the angled portion formed by the top surface and the rear surface of the magnet 10A are angled portions on an upper side, of the magnet 10A. As described above, the linear transporter 1 is configured such that the corner portions of the inner wall surface of the magnetic shield 20A in contact with the respective angled portions on an upper side, of the magnet 10A, are in tight contact with the respective angled portions on an upper side, of the magnet 10A, thereby leaving no space between the magnetic shield 20A and the magnet 10A. Note that the inner wall surface of the magnetic shield 20A may cover the two lateral surfaces other than the front surface and the rear surface, of the outer wall surface of the magnet 10A having a rectangular parallelepiped shape.

The magnetic shield 20A is formed of a material having a magnetic permeability greater than 1, such as iron. Specifically, the magnetic shield 20A is formed of a resin containing a magnetic material powder. In the first embodiment, the magnetic shield 20A, including a portion for blocking magnetic energy, and the magnet 10A are formed by integral molding, thereby causing the magnetic shield 20A and the magnet 10A to be in tight contact with each other without a space therebetween. This configuration causes the magnetic shield 20A and the magnet 10A to fixedly hold each other. That is, the magnetic shield 20A fixedly holds the magnet 10A, and the magnet 10A fixedly holds the magnetic shield 20A.

During the integral molding in the first embodiment, the magnet 10A, for example, is formed first by injection molding using a mold for the magnet 10A. That is, a magnetic material is poured into the mold for the magnet 10A, and the magnet 10A is thus formed. Then, the magnet 10A is placed in a mold for a magnetic material resin (i.e., for the magnetic shield 20A), and the magnetic material resin is poured into the mold for the magnetic material resin. The mold for the magnetic material resin has a void in a portion for forming the magnetic shield 20A and in a portion for placing the magnet 10A. Regarding this void portion, the magnet 10A is placed in the portion for placing the magnet 10A, and the magnetic material resin is poured into the portion for forming the magnetic shield 20A, thereby causing the magnetic shield 20A to be molded integrally with the magnet 10A.

Note that during the integral molding in the first embodiment, the magnetic shield 20A may be formed first. In this case, the magnetic shield 20A is formed first by injection molding using the mold for the magnetic shield 20A. That is, the magnetic material resin is poured into the mold for the magnetic material resin, and the magnetic shield 20A is thus formed. Then, the magnetic shield 20A is placed in the mold for the magnet 10A, and the magnetic material is poured into the mold for the magnet 10A. The mold for the magnet 10A has a void in a portion for forming the magnet 10A and in a portion for placing the magnetic shield 20A. Regarding this void portion, the magnetic shield 20A is placed in the portion for placing the magnetic shield 20A, and the magnetic material is poured into the portion for forming the magnet 10A, thereby causing the magnet 10A to be molded integrally with the magnetic shield 20A.

In the case where the magnet 10A is formed before the magnetic shield 20A is formed, the mold for the magnet 10A is a first mold, and the mold for the magnetic shield 20A is a second mold. Alternatively, in the case where the magnetic shield 20A is formed before the magnet 10A is formed, the mold for the magnetic shield 20A is the first mold, and the mold for the magnet 10A is the second mold.

The magnetic detection element 30 detects the magnetic field generated by the magnet 10A. Specifically, the magnetic detection element 30 converts the amount of displacement of the magnetic field generated by the magnet 10A into an amount of change of a signal output. An example of the magnetic detection element 30 is a Hall element. The magnetic detection element 30 sends information on the magnetic field detected to the calculator 40. The multiple magnetic detection elements 30 are installed on the transport rail 5 along the moving direction of the magnetizer MA. The magnetic field detected by each of the magnetic detection elements 30 varies as the magnetizer MA moves.

The calculator 40 calculates the position (position data) of the carrier 2 (magnetizer MA) on the basis of a detection value of the magnetic flux (e.g., magnetic flux density) sent from the magnetic detection element 30. The position of the carrier 2 corresponds to the position of the magnet 10A and to the position of the mover mV. The calculator 40 sends the position data with respect to the carrier 2 to the servo amplifier 50.

Figure 3:
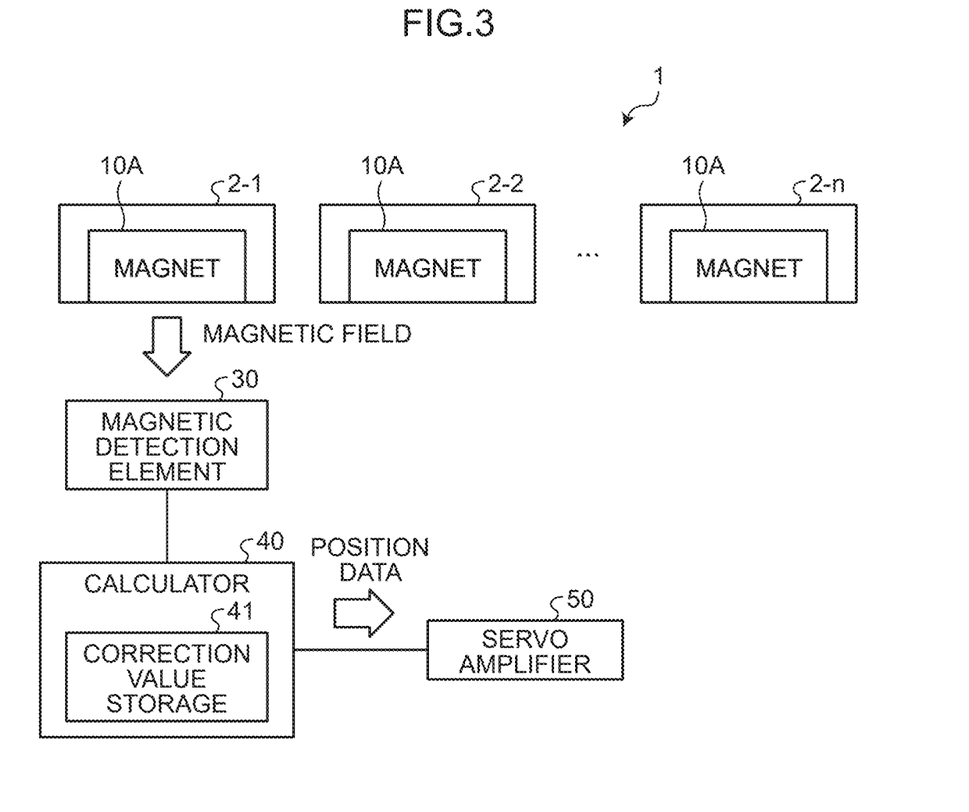
FIG. 3 is a block diagram illustrating the configuration of the linear transporter according to the first embodiment.

FIG. 3 is a block diagram illustrating a configuration of the linear transporter according to the first embodiment. The linear transporter 1 includes multiple carriers 2-1 to 2-$n$ (where n is a natural number greater than or equal to 2). The carriers 2-1 to 2-$n$ are carriers similar to the carriers 2 described with reference to FIG. 2. In the description of the first embodiment, the carriers 2-1 to 2-$n$ may be referred to as carriers 2 when no distinction needs to be made among the carriers 2-1 to 2-$n$. The carriers 2-1 to 2-$n$ respectively include the magnets 10A having a same shape and the magnetic shields 20A (not illustrated in FIG. 3) having a same shape.

In the linear transporter 1, the carriers 2-1 to 2-$n$ move along the transport rail 5. The magnetic detection element 30 detects the magnetic field generated by the magnet 10A included in each of the carriers 2-1 to 2-$n$ when each of the carriers 2-1 to 2-$n$ passes over the magnetic detection element 30. The magnetic detection element 30 sends information on the magnetic field detected to the calculator 40.

The calculator 40 includes a correction value storage 41. The correction value storage 41 stores in advance a correction value for correcting the positions of the carriers 2-1 to 2-$n$. This correction value is a correction value (error correction value) for detecting the position of the magnet 10A with high accuracy. Note that the correction value storage 41 may be disposed outside the calculator 40.

The correction value for correcting the positions of the carriers 2-1 to 2-$n$ may be: a correction value for correcting a signal representing the magnetic flux density (i.e., signal correction value); or a correction value for correcting the positions of the carriers 2-1 to 2-$n$ themselves calculated from the signal representing the magnetic flux density (i.e., position correction value). The following description will describe the case where the correction value for correcting the positions of the carriers 2-1 to 2-$n$ is a signal correction value, which is a correction value for correcting the signal representing the magnetic flux density.

For example, when the magnetic flux density of the magnet 10A of each of the carriers 2-1 to 2-n, detected by the magnetic detection element 30, is represented by a sine wave signal, correction values for correcting values such as the amplitude and an offset of the sine wave signal are each a signal correction value for correcting the positions of the carriers 2-1 to 2-n. The calculator 40 corrects values such as the amplitude and the offset of the sine wave signal using signal correction values stored in the correction value storage 41. Letting B denote the magnetic flux density of the magnet 10A of each of the carriers 2-1 to 2-n, this magnetic flux density is represented as, for example, $B=P \sin \theta + Q$, where P is the amplitude and Q is the offset. The offset is a deviation from a center value "0" of the average value of the signal waveform. The signal correction values are obtained in advance and are stored in the correction value storage 41 before shipment of the linear transporter 1.

The calculator 40 corrects the signal representing the magnetic flux density sent from each of the magnetic detection elements 30 using the signal correction values stored in the correction value storage 41. The calculator 40 calculates the position data with respect to the carriers 2-1 to 2-n on the basis of a signal obtained by correction of the signal representing the magnetic flux density. The calculator 40 sends the position data with respect to the carriers 2-1 to 2-n to the servo amplifier 50.

The signal correction values stored in advance in the correction value storage 41 are values common to the carriers 2-1 to 2-n. Note that it is sufficient that signal correction values commonly applicable to at least two of the carriers 2-1 to 2-n be used in the linear transporter 1. That is, it is sufficient that the number of sets of signal correction values (e.g., sets of correction values for the amplitude and correction values for the offset) to be stored in advance in the correction value storage 41 be less than the number of the carriers 2-1 to 2-n. That is, it is sufficient that the number of correction value sets, each of which is a combination of correction values, be less than the number of the carriers 2-1 to 2-n. The following description describes a case where there is one correction value set. Note that the correction values included in the correction value set may be of one type or of multiple types.

The servo amplifier 50 controls the linear motor on the basis of the position data with respect to the carrier 2. Such control causes electrical power supplied to the stator 4 to be adjusted to electrical power appropriate for the position of the mover mV. Adjustment of the electrical power supplied to the stator 4 provides adjustment of the magnitudes of the magnetic fields for driving generated by the mover mV and by the stator 4, thereby provides adjustment of the position of the mover mV. In other words, the carrier 2 moves along the transport rail 5.

In the first embodiment, the magnetic shield 20A and the magnet 10A are formed by integral molding, thereby causing the magnetic shield 20A and the magnet 10A to be in tight contact with each other without a space therebetween. Thus, the linear transporter 1 includes no space between the magnetic shield 20A and the magnet 10A, thereby suppressing occurrence of an irregularity in the magnetic flux or an irregularity in the magnetic lines of force. This enables the linear transporter 1: to detect sine wave signals resembling one another from the respective carriers 2-1 to 2-n; and to correct the sine wave signals using signal correction values commonly applicable to the carriers 2-1 to 2-n.

In addition, performing integral molding to form the magnetic shield 20A and the magnet 10A of the linear transporter 1 can suppress a manufacturing variation in the shapes of the magnetic shield 20A and of the magnet 10A, and can easily bring the magnetic shield 20A and the magnet 10A into tight contact with each other without a space therebetween. This can suppress occurrence of an irregularity in the magnetic flux or an irregularity in the magnetic lines of force.

When one of the carriers 2 that is not the target of position detection is away from the carrier 2 that is the target of position detection, the magnetic detection element 30 detects only the magnetic field generated by the magnet 10A of the carrier 2 that is the target of position detection, and does not detect the magnetic field generated by the magnet 10A of the carrier 2 that is not the target of position detection.

When a carrier 2 that is not the target of position detection comes close to the carrier 2 that is the target of position detection, the magnetic detection element 30 will detect the magnetic field generated by the magnet 10A of the carrier 2 that is not the target of position detection if the carrier 2 that is not the target of position detection does not include the magnetic shield 20A. In this case, accuracy in detection of the position of the carrier 2 will be reduced.

The linear transporter 1 of the first embodiment includes the magnetic shield 20A in each of the carriers 2, and can therefore suppress a decrease in accuracy in position detection. That is, since the linear transporter 1 includes the magnetic shield 20A, magnetic force that generates magnetic lines of force forming small loops, of the magnetic force originating from the magnet 10A of a carrier 2 that is not the target of position detection, is blocked by the lateral magnetic shielding portions, and is thereby prevented from reaching the magnetic detection element 30. In addition, since the linear transporter 1 includes the magnetic shield 20A, magnetic force that generates magnetic lines of force forming large loops, of the magnetic force originating from a carrier 2 that is not the target of position detection, is blocked by the top-surface magnetic shielding portion, and is thereby prevented from reaching the magnetic detection element 30.

Aside from this, there is a method for forming the magnetic shield by bending a plate-shaped magnetic body (hereinafter referred to as method M1). The method M1 involves a bending radius (corner radius) occurring in a bent portion due to a manufacturing tolerance when the plate-shaped magnetic body is bent. This prevents the magnet from coming into tight contact with the bent portion of the magnetic shield (i.e., the corner portion facing the angled portion of the magnet, of the inside surface of the magnetic shield). Thus, the method M1 causes an air gap between the magnet and the magnetic shield, thereby causing an irregularity in the magnetic flux or in the magnetic lines of force. Such irregularity in the magnetic flux or in the magnetic lines of force may result in a variation in position detection values from the position detector. This will reduce accuracy in detection of the position of a carrier. Moreover, the method M1 has difficulty in performing shallow bending. This necessitates the dimension of the lateral magnetic shielding portions in the depth direction reaching or exceeding a specific value, which makes thickness reduction difficult.

In addition, there is a method for forming the magnetic shield by cutting a block of magnetic material into a right-angled U shape (hereinafter referred to as method M2). The method M2 cannot form the corner portion of the bottom of the right-angled U-shaped portion (i.e., the corner portion facing the angled portion of the magnet, of the inside surface of the magnetic shield) to have a right angle due to a manufacturing tolerance, and leaves a curved surface or a C-shaped surface in the corner portion of the bottom of the right-angled U-shaped portion. This prevents the magnet from coming into tight contact with the corner portion of the inside surface of the magnetic shield. Thus, the method M2 causes an air gap between the magnet and the magnetic shield, thereby causing an irregularity in the magnetic flux or in the magnetic lines of force. Such irregularity in the magnetic flux or in the magnetic lines of force may result in a variation in position detection values from the position detector. This will reduce accuracy in detection of the position of a carrier. Moreover, the magnetic material block is formed of a metal harder than aluminum or brass, thereby making the machining process more time-consuming and costly.

As described above, both the methods M1 and M2 cause an error of relational position between the magnet and the magnetic shield due to a manufacturing tolerance of a component (specifically, the magnetic shield), thereby causing a variation in the magnetic fields generated by the respective carriers. Thus, when carriers produced using one of the methods M1 and M2 are used in the linear transporter, suppressing of a decrease in accuracy in detection of the positions of the carriers will require calculation of signal correction values on a per-carrier basis during acceptance test, and will require storing in advance the signal correction values in the correction value storage. For example, when a single linear transporter carries 100 carriers (N=100), the correction value storage needs to store in advance signal correction values for the magnets of the 100 carriers, which will require a very high capacity memory. In addition, determination of signal correction values for 100 magnets needs a long calculation time and a large amount of work, which will increase manufacturing cost of the linear transporter.

In contrast, the magnet 10A and the magnetic shield 20A in the first embodiment are formed by integral molding including pouring of a magnetic material and a magnetic material resin. This causes the magnet 10A and the magnetic shield 20A to be brought into tight contact with each other. This prevents an air gap from occurring between the magnet 10A and the magnetic shield 20A, and thus prevents a relational position offset from occurring between the magnet 10A and the magnetic shield 20A. This eliminates a variation in the magnetic fields generated by the magnetizers MA, thereby enabling the linear transporter 1 to suppress a decrease in accuracy in detection of the position of the magnet 10A of each of the carriers 2. In addition, in the first embodiment, production with high accuracy of the resin-molding mold (i.e., the mold for the magnetic shield 20A), which is a mold for the magnetic material resin, can reduce the manufacturing tolerance of the magnetic shield 20A.

As described above, the linear transporter 1 in the first embodiment can suppress a variation in the magnetic fields generated by the magnets 10A of the N carriers 2. Accordingly, storing one set of signal correction values in the correction value storage 41 is sufficient. This significantly reduces the storage capacity required for the correction value storage 41, and can reduce the cost of the linear transporter 1. This can also reduce the time for determining the signal correction values, and can thus reduce manufacturing cost of the linear transporter 1.

Moreover, the magnetic shield 20A is formed by molding integrally with the magnet 10A using a resin containing a magnetic material powder (i.e., a resin with a magnetic material powder) in the first embodiment, thereby enabling the magnet 10A to have a thickness less than the thickness that will be achieved by the method M1.

Furthermore, the magnetic shield 20A is formed by molding integrally with the magnet 10A using a resin containing a magnetic material powder in the first embodiment, thereby enabling the magnetic shield 20A and the magnet 10A to be brought into tight contact with each other without a space therebetween over all of the surfaces on which the magnetic shield 20A and the magnet 10A face each other, including the corner portions of the inside surface of the magnetic shield 20A. This can increase accuracy in detection of the position of the magnet 10A, and can reduce cost by reduction in processing time in the first embodiment, as compared to when one of the methods M1 and M2 is used.

In addition, when considering a case of a rotational angle detection device for detecting a rotational angle of a motor shaft (rotating body), magnets and rotational angle sensors are in a one-to-one relationship. Accordingly, one set of signal correction values is sufficient for correcting the positions of magnets. In contrast, the linear transporter 1 includes the multiple (N) carriers 2 each including the mover mV. This leads to an N-to-one relationship (where N≥2) among the magnets 10A used for position detection and the magnetic detection element 30. That is, each one of the magnetic detection elements 30 detects the positions of the N magnets 10A. Thus, if the magnet 10A and the magnetic shield 20A are subjected to a large manufacturing variation, this will require N correction values to be stored in advance in the correction value storage 41. In the first embodiment, the magnet 10A and the magnetic shield 20A are subjected to a small manufacturing variation, and it is thus sufficient to store in advance a single correction value e in the correction value storage 41.

As described above, the magnetic shield 20A is formed by molding integrally with the magnet 10A using a resin containing a magnetic material powder in the first embodiment, thereby reducing variation among individual components in dimension of the magnetic shield 20A and in positional relationship of the magnetic shield 20A relative to the magnet 10A. This enables variation in shape accuracy among the magnetizers MA to be suppressed, and thus enables the linear transporter 1 to provide high accuracy positioning using one type of correction value.

Figure 4:
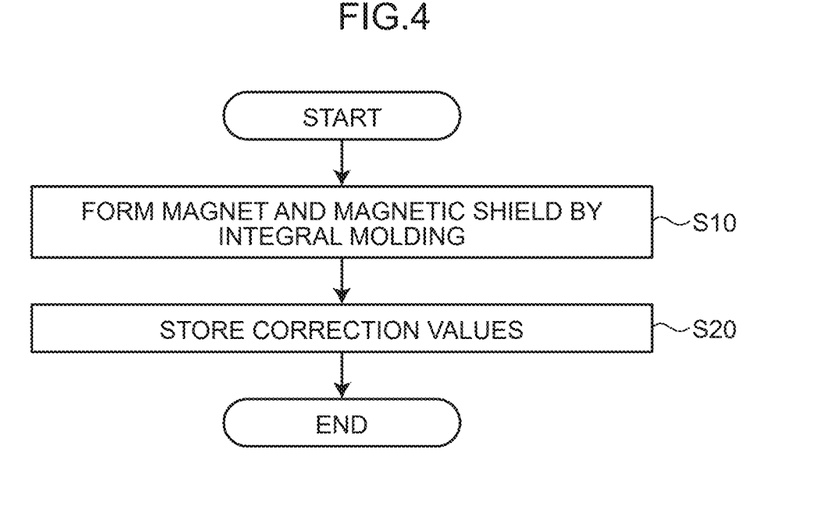
FIG. 4 is a flowchart illustrating a process procedure for manufacturing the linear transporter according to the first embodiment.

A process procedure for manufacturing the linear transporter 1 will next be described. FIG. 4 is a flowchart illustrating a process procedure for manufacturing the linear according to the first embodiment. The linear transporter 1 of the first embodiment is manufactured by forming the magnet 10A and the magnetic shield 20A by integral molding (step S10). N sets of the magnets 10A and the magnetic shields 20A formed by integral molding are produced. The carriers 2-1 to 2-$n$ each including the magnet 10A and the magnetic shield 20A formed by integral molding are produced.

One set of correction values (i.e., a signal correction value, a position correction value, and/or the like) is calculated for the set of the N carriers 2-1 to 2-$n$. The correction values calculated are stored in the correction value storage 41 of the linear transporter 1 (step S20).

Note that when M (where M is natural number greater than or equal to 2) linear transporters 1 are to be manufactured, M×N sets of the magnets 10A and the magnetic shields 20A formed by integral molding are produced. Then, one set of correction value is calculated for the M×N carriers 2.

The correction value calculated is stored in the correction value storage 41 of each of the linear transporters 1.

As described above, the linear transporter 1 of the first embodiment includes the magnetic shield 20A and the magnet 10A that are formed by integral molding, and the number of combinations of correction values (i.e., correction value sets) for correcting the positions of the carriers 2 is less than the number of the carriers 2. In addition, the linear transporter 1 corrects the position of one of the carriers 2 by applying, to the one of the carriers 2, a correction value set commonly applicable to another one of the carriers 2. This enables the linear transporter 1 to easily suppress a decrease in accuracy in position detection.

Second Embodiment

A second embodiment will next be described with reference to FIG. 5. In the second embodiment, the magnet is tapered.

Figure 5:
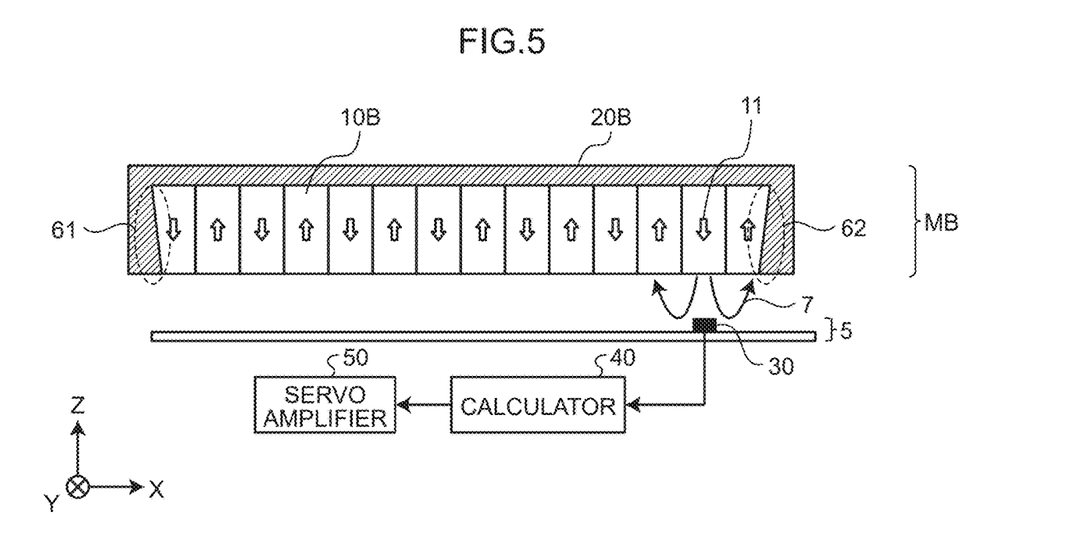
FIG. 5 is a side view illustrating a configuration of a magnetizer included in the linear transporter according to a second embodiment.

FIG. 5 is a side view illustrating a configuration of a magnetizer included in the linear transporter according to the second embodiment. The same reference characters are used to indicate components, of the components of FIG. 5, that provide functionality the same as the functionality of the corresponding components of the linear transporter 1 of the first embodiment illustrated in FIG. 2, and duplicate description thereof will be omitted.

The linear transporter 1 of the second embodiment includes a magnetizer MB in place of the magnetizer MA of the linear transporter 1 of the first embodiment. The linear transporter 1 of the second embodiment includes the magnetizer MB in each of the multiple carriers 2, but FIG. 5 illustrates one of the magnetizers MB.

The magnetizer MB includes a magnet 10B and a magnetic shield 20B. Also, in the case of the magnetizer MB, the magnetic shield 20B is formed by molding integrally with the magnet 10B, and the magnetic shield 20B is thus in tight contact with the magnet 10B. The magnet 10B has, similarly to the first embodiment, a counter surface that faces the transport rail 5, a top surface opposite the counter surface, and two end surfaces and other two lateral surfaces in the moving direction.

The magnet 10B of the magnetizer MB is tapered as viewed in the Y-axis direction in such a manner that two end surfaces 61 and 62 thereof in the moving direction of the magnetizer MB (moving direction of the carriers 2) are inclined. Being tapered, the magnet 10B has a width in the X-axis direction (i.e., width in the moving direction) gradually decreasing in a direction from the top surface of the magnet 10B to the counter surface of the magnet 10B. That is, the magnet 10B has a width gradually decreasing in a direction from the positive Z-direction to the negative Z-direction. The taper angle (taper ratio) of the magnet 10B is a taper angle that can provide a desired magnetic flux density waveform.

The magnetic shield 20B of the magnetizer MB has a shape in which the lateral magnetic shielding portions thereof provided on the two end surfaces 61 and 62 in the moving direction of the magnet 10B are reverse tapered as viewed in the Y-axis direction. Being reverse tapered in such a manner that the inside surfaces of the lateral magnetic shielding portions are inclined, the magnetic shield 20B has a width in the X-axis direction (i.e., width in the moving direction) gradually increasing in a direction from the top surface of the magnet 10B to the counter surface of the magnet 10B. That is, the lateral magnetic shielding portions each have a width gradually increasing in a direction from the positive Z-direction to the negative Z-direction. The reverse taper angle of the magnetic shield 20B is a reverse taper angle that can provide a desired magnetic flux density waveform.

As described above: the width of the magnet 10B in the X-direction gradually decreases in a direction from the top surface of the magnet 10B to the counter surface of the magnet 10B; and the width of the magnetic shield 20B in the X-direction gradually increases in the direction from the top surface of the magnet 10B to the counter surface of the magnet 10B. That is, the top surface of the magnet 10B is larger in size than the opening of the magnetic shield 20B. In addition to this, in the magnetizer MB, the end surfaces of the magnet 10B in the moving direction thereof are in tight contact with the inner wall surfaces of the magnetic shield 20B in the moving direction thereof. That is, the reverse taper angle of the magnetic shield 20B is an angle equivalent to the taper angle of the magnet 10B.

The tapered shape in which the width of the magnet 10B gradually decreases in the direction from the top surface of the magnet 10B to the counter surface of the magnet 10B is difficult to be formed using the methods M1 and M2 described above. That is, use of either the method M1 or the method M2 does not enable the magnet 10B having a tapered structure to be brought into tight contact with the magnetic shield without a space therebetween, where the method M1 is a method for forming the magnetic shield by bending a plate-shaped magnetic body, and the method M2 is a method for forming the magnetic shield by cutting a block of magnetic material.

As described above, in the second embodiment, the magnet 10B having a tapered shape and the magnetic shield 20B are formed by integral molding, thereby enabling a structure to be provided in which the magnet 10B having a tapered shape and the magnetic shield 20B having a reverse-tapered shape are in tight contact with each other. Bringing the magnet 10B having a tapered shape and the magnetic shield 20B having a reverse-tapered shape into tight contact with each other enables the magnetic flux density waveform to have a desired shape.

In addition, the magnetizer MB is configured such that the top surface of the magnet 10B is larger in size than the opening provided between the lateral magnetic shielding portions of the magnetic shield 20B on the side nearer to the counter surface of the magnet 10B. This can prevent the magnet 10B from separating from the magnetic shield 20B when the magnetizer MB is moving fast or the magnetizer MB is moving along a curve. That is, the magnet 10B having a shape tapered in the negative Z-direction and the magnetic shield 20B having a shape reverse-tapered in the negative Z-direction are in tight contact with each other, and the magnetizer MB can therefore prevent falling off of the magnet 10B.

Third Embodiment

A third embodiment will next be described with reference to FIG. 6. In the third embodiment, the magnetic shield is tapered.

Figure 6:
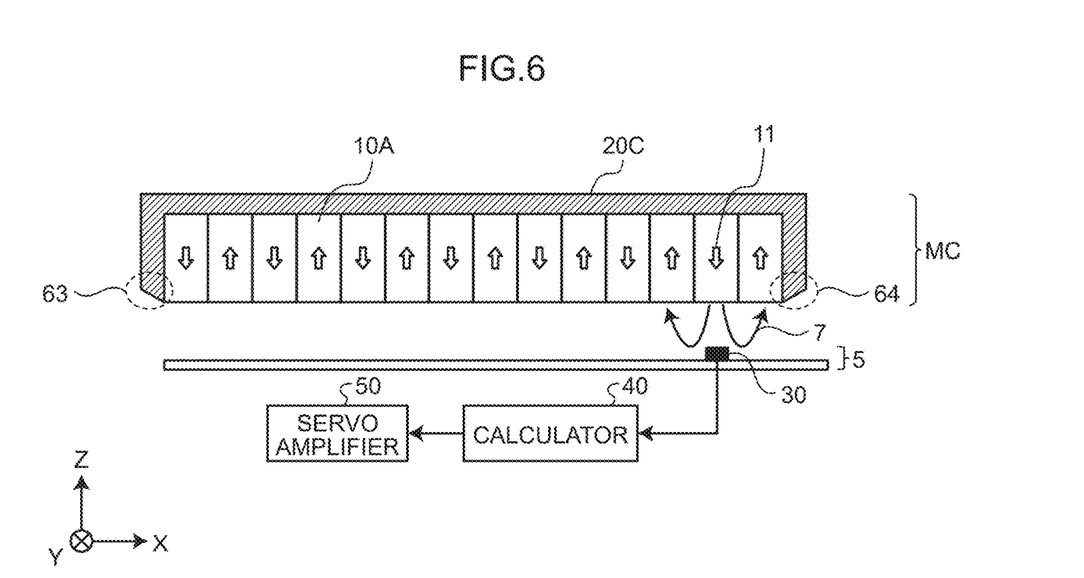
FIG. 6 is a side view illustrating a configuration of a magnetizer included in the linear transporter according to a third embodiment.

FIG. 6 is a side view illustrating a configuration of a magnetizer included in the linear transporter according to the third embodiment. The same reference characters are used to indicate components, of the components of FIG. 6, that provide functionality the same as the functionality of the corresponding components of the linear transporter 1 of the first embodiment illustrated in FIG. 2, and duplicate description thereof will be omitted.

The linear transporter 1 of the third embodiment includes a magnetizer MC in place of the magnetizer MA of the linear transporter 1 of the first embodiment. The linear transporter 1 of the third embodiment includes the magnetizer MC in each of the multiple carriers 2, but FIG. 6 illustrates one of the magnetizers MC.

The magnetizer MC includes the magnet 10A and a magnetic shield 20C. Also, in the case of the magnetizer MC, the magnetic shield 20C is formed by molding integrally with the magnet 10A, and the magnetic shield 20C is thus in tight contact with the magnet 10A.

The magnetic shield 20C of the magnetizer MC has a shape in which the lateral magnetic shielding portions thereof provided on the two end surfaces in the moving direction of the magnet 10A are tapered as viewed in the Y-axis direction. The lateral magnetic shielding portions provided on the two end surfaces of the magnet 10A each have a shape in which an end portion nearer to the counter surface, of the inside surface of each of the lateral magnetic shielding portions is longer in length than an end portion nearer to the counter surface, of the outside surface opposite the inside surface of each of the lateral magnetic shielding portions, in a direction from the top surface to the counter surface of the magnet 10A (i.e., the negative Z-axis direction). Accordingly, the surface connecting between these end portions nearer to the counter surface, of each pair of one of the inside surfaces and a corresponding one of the outside surfaces is an inclined surface. In other words, due to the shape tapered in such a manner that the surface on the side nearer to the counter surface of the magnet 10A, of each of the lateral magnetic shielding portions is inclined, leading end portions 63 and 64 of the lateral magnetic shielding portions of the magnetic shield 20C in the negative Z-direction each have a width in the X-axis direction (i.e., width in the moving direction) gradually decreasing in a direction from the top surface of the magnet 10A to the counter surface of the magnet 10A. That is, the leading end portions 63 and 64 of the lateral magnetic shielding portions in the negative Z-direction each have a width gradually decreasing in a direction from the positive Z-direction to the negative Z-direction. The taper angle of the magnetic shield 20C is a taper angle that can provide a desired magnetic flux density waveform.

As described above, the leading end portions 63 and 64 of the magnetic shield 20C in the negative Z-direction each have a shape in which the width of the magnetic shield 20C in the X-direction gradually decreases in a direction toward the magnetic detection elements 30. The tapered structure in which the width of each of the leading end portions 63 and 64 of the magnetic shield 20C in the negative Z-direction gradually decreases in the direction toward the magnetic detection elements 30 is difficult to be formed using the methods M1 and M2 described above.

As described above, in the third embodiment, bringing the magnet 10A and the magnetic shield 20C having a tapered shape into tight contact with each other enables the magnetic flux density waveform to have a desired shape.

The configurations described in the foregoing embodiments are merely examples. These configurations may be combined with another known technology, and configurations of different embodiments may be combined together. Moreover, such configurations may be partly omitted and/or modified without departing from the gist.

The foregoing first embodiment has been described in which the magnet 10A and the magnetic shield 20A are manufactured by integral molding to manufacture the linear transporter 1. However, the magnet 10A and the magnetic shield 20A may be manufactured using a means other than integral molding. For example, a method for manufacturing the linear transporter 1 includes cutting out a magnetic body that will serve as the magnet 10A and a magnetic body that will serve as the magnetic shield 20A with high accuracy from a single block of magnetic material using high-precision processing such as laser processing. This method for manufacturing the linear transporter 1 further includes magnetization of the magnetic body cut out to serve as the magnet to produce the magnet 10A, and joining the magnetic shield 20A cut out and the magnet 10A together to form the magnetizer MA. This method for manufacturing the linear transporter 1 further includes thereafter assembling the carriers 2 each including the magnetizer MA, and calculating one set of correction values (i.e., a signal correction value, a position correction value, and/or the like) for the set of the N carriers 2. The linear transporter 1 may then be manufactured by storing the correction values calculated, in the correction value storage 41 of the linear transporter 1.

A linear transporter 1 manufactured by such manufacturing method also can reduce variation among individual components in dimension of the magnetic shield 20A and in positional relationship of the magnetic shield 20A relative to the magnet 10A, and can thus prevent occurrence of an irregularity in the magnetic flux or in the magnetic lines of force. Such linear transporter 1 can also suppress variation in shape accuracy among the magnetizers MA, thereby enabling the linear transporter 1 to correct the position of one of the carriers 2 by applying, to the one of the carriers 2, a correction value set commonly applicable to another one of the carriers 2. This can prevent an increase in the cost of the linear transporter 1 and in manufacturing cost of the linear transporter 1, and can also easily suppress a decrease in accuracy in position detection.

REFERENCE SIGNS LIST

1 linear transporter; 2, 2-1 to 2-*n* carrier; 4 stator; 5 transport rail; 10A, 10B magnet; 20A-20C magnetic shield; 30 magnetic detection element; 40 calculator; 41 correction value storage; 50 servo amplifier; 61, 62 two end surfaces; 63, 64 leading end portion; MA-MC magnetizer; mV mover.

The invention claimed is:

1. A linear transporter comprising:
a transport path including a stator;
a plurality of transport bodies configured to move along the transport path;
a magnetizer installed on each of the transport bodies configured to generate a magnetic field for use in position detection;
a magnetic detection element installed on the transport path configured to detect the magnetic field;
a calculator configured to calculate a position of each of the transport bodies on a basis of the magnetic field detected by the magnetic detection element; and
a correction value storage configured to store a correction value set that is a combination of correction values for correcting the position of each of the transport bodies, wherein
the magnetizer includes:
a magnet in which magnetic poles of different polarities are arranged alternately along a moving direction of the transport bodies; and
a magnetic shield that is a magnetic body and is formed of a resin containing a magnetic material powder, the magnetic shield blocking magnetic lines of force originating from the magnet by being provided on two end surfaces of the magnet in the moving direction and on a top surface of the magnet, the top surface being a surface opposite a counter surface that faces the transport path, a number of the correction value set is less than a number of the transport bodies, and the calculator is configured to correct the position by using one of the at least one correction value set, the one being for use in correction of a position of at least one transport body of the transport bodies, also as one of the at least one correction value set for correcting a position of another one of the transport bodies.

2. The linear transporter according to claim 1, wherein the magnet and the magnetic shield are formed by integral molding.

3. The linear transporter according to claim 1, wherein the number of the correction value set is one, and the calculator is configured to correct the positions of all of the transport bodies using a common correction value set.

4. The linear transporter according to claim 1, wherein an angled portion on an upper side, of the magnet, is in tight contact with a corner portion of an inner wall surface of the magnetic shield, the corner portion being in contact with the angled portion.

5. The linear transporter according to claim 1, wherein the correction value is a signal correction value for correcting a signal representing a magnetic flux density detected by the magnetic detection element.

6. The linear transporter according to claim 1, wherein the correction value is a position correction value for correcting the position itself of each of the transport bodies calculated from a signal representing a magnetic flux density detected by the magnetic detection element.

7. The linear transporter according to claim 2, wherein the integral molding causes the magnetic shield and the magnet to fixedly hold each other.

8. The linear transporter according to claim 1, wherein the magnet is tapered in such a manner that the two end surfaces in the moving direction are inclined to cause the magnet to have a width in the moving direction decreasing in a direction from the top surface to the counter surface, portions of the magnetic shield provided on the respective two end surfaces of the magnet are reverse tapered in such a manner that inner wall surfaces in the moving direction are inclined to cause these portions of the magnetic shield to each have the width in the moving direction increasing in the direction from the top surface to the counter surface, and the two end surfaces of the magnet in the moving direction are in tight contact respectively with the inner wall surfaces of the magnetic shield.

9. The linear transporter according to claim 1, wherein portions of the magnetic shield provided on the respective two end surfaces of the magnet are formed such that an end portion nearer to the counter surface, of each of inside surfaces in the moving direction is longer in length than the end portion nearer to the counter surface, of each of outside surfaces opposite the respective inside surfaces in the moving direction, in the direction from the top surface to the counter surface, and a surface connecting between the end portions nearer to the counter surface, of each pair of one of the inside surfaces and a corresponding one of the outside surfaces is an inclined surface.

10. A method for manufacturing the linear transporter according to claim 1, comprising:

a molding step of forming the magnet and the magnetic shield by integral molding; and a correction value storing step of storing the at least one correction value set in the correction value storage.

11. The method for manufacturing the linear transporter, according to claim 10, wherein the molding step includes a first formation step of forming the magnet by pouring a magnetic material into a first mold, and a second formation step of placing the magnet in a second mold and of forming the magnetic shield by pouring a magnetic material resin into the second mold in a presence of the magnet.

12. The method for manufacturing the linear transporter, according to claim 10, wherein the molding step includes a first formation step of forming the magnetic shield by pouring a magnetic material resin into a first mold, and a second formation step of placing the magnetic shield in a second mold and of forming the magnet by pouring a magnetic material into the second mold in a presence of the magnetic shield.

* * * * *